US007176440B2

(12) United States Patent
Cofer et al.

(10) Patent No.: US 7,176,440 B2
(45) Date of Patent: Feb. 13, 2007

(54) METHOD AND APPARATUS FOR DETECTING OBJECTS USING STRUCTURED LIGHT PATTERNS

(75) Inventors: Darren D. Cofer, Minnetonka, MN (US); Rida M. Hamza, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 243 days.

(21) Appl. No.: 10/465,267

(22) Filed: Jun. 19, 2003

(65) Prior Publication Data

US 2004/0256541 A1 Dec. 23, 2004
US 2006/0038114 A9 Feb. 23, 2006

Related U.S. Application Data

(63) Continuation-in-part of application No. 10/052,953, filed on Jan. 17, 2002, now Pat. No. 6,841,780.

(60) Provisional application No. 60/262,925, filed on Jan. 19, 2001.

(51) Int. Cl.
*G08B 13/00* (2006.01)

(52) U.S. Cl. .................. 250/221; 250/237 R; 382/103; 340/541

(58) Field of Classification Search ................. 250/221, 250/237 R; 382/103, 107; 340/555–557, 340/541; 348/143, 152
See application file for complete search history.

(56) References Cited

U.S. PATENT DOCUMENTS 4,923,066 A 5/1990 Ophir et al.

5,003,166 A * 3/1991 Girod ....................... 250/201.4
D347,442 S 5/1994 Falconer (Continued)

FOREIGN PATENT DOCUMENTS

DE 19809210 9/1999

(Continued)

OTHER PUBLICATIONS

English translation of JP01-232497.*

(Continued)

*Primary Examiner*—Thanh X. Luu
*Assistant Examiner*—Stephen Yam
(74) *Attorney, Agent, or Firm*—Kris T. Fredrick (57) ABSTRACT

An object detection system is provided that projects one or more patterns onto a monitored area, captures one or more live images of the monitored area, and detects objects that enter the monitored area by detecting changes in the one or more patterns in the live images. Such an object detection system may be less susceptible to dynamic lighting conditions, and more sensitive to object intrusions. One illustrative example projects a pattern of dots onto an area to be monitored, and captures images corresponding to the monitored area, comparing live images to reference images to determine whether an object has intruded a defined area. The area to be monitored does not consist solely of the area captured in the images and may include a volume illuminated by the pattern as well as a volume corresponding to the captured image area. Objects not in the field of view may be detected by the disclosed systems and methods. Several illustrative analytical methods are disclosed as well.

19 Claims, 8 Drawing Sheets

U.S. PATENT DOCUMENTS

| | | |
|---|---|---|
| D349,713 S | 8/1994 | Hasegawa |
| D349,714 S | 8/1994 | Hasegawa |
| D349,911 S | 8/1994 | Shimizu et al. |
| D349,913 S | 8/1994 | Morris |
| 5,359,363 A | 10/1994 | Kuban et al. |
| D354,973 S | 1/1995 | Hisatune et al. |
| 5,402,168 A | 3/1995 | Fouilloy |
| 5,418,567 A | 5/1995 | Boers et al. |
| 5,436,462 A | 7/1995 | Hull-Allen |
| 5,448,320 A | 9/1995 | Sakai et al. |
| 5,477,212 A | 12/1995 | Rumpel |
| D365,834 S | 1/1996 | Dozier |
| 5,539,199 A | 7/1996 | Ruckh et al. |
| 5,573,006 A | 11/1996 | Shimotani et al. |
| D378,095 S | 2/1997 | Hasegawa |
| 5,613,013 A | 3/1997 | Schuette |
| 5,627,616 A | 5/1997 | Sergeant et al. |
| 5,649,255 A | 7/1997 | Schieltz |
| 5,657,076 A | 8/1997 | Tapp |
| 5,677,535 A | 10/1997 | Stephan |
| 5,691,765 A | 11/1997 | Schieltz et al. |
| 5,731,832 A | 3/1998 | Ng |
| 5,745,170 A | 4/1998 | Palmer |
| 5,752,100 A | 5/1998 | Schrock |
| 5,790,910 A | 8/1998 | Haskin |
| 5,793,900 A | 8/1998 | Nourbakhsh et al. |
| 5,795,306 A | 8/1998 | Shimotani et al. |
| 5,801,770 A | 9/1998 | Paff et al. |
| D399,517 S | 10/1998 | Hasegawa |
| 5,818,519 A | 10/1998 | Wren |
| 5,835,218 A | 11/1998 | Harding |
| 5,835,613 A | 11/1998 | Breed et al. |
| 5,845,000 A | 12/1998 | Breed et al. |
| 5,852,754 A | 12/1998 | Schneider |
| 5,870,135 A | 2/1999 | Glatt et al. |
| 5,878,156 A | 3/1999 | Okumura |
| 5,953,055 A | 9/1999 | Huang et al. |
| 5,980,123 A | 11/1999 | Heifler |
| 6,035,067 A | 3/2000 | Ponticos |
| 6,075,238 A * | 6/2000 | Fembok ................ 250/221 |
| 6,286,349 B1 | 9/2001 | Muller et al. |
| 6,392,754 B1 | 5/2002 | Pingel et al. |
| 6,456,320 B2 | 9/2002 | Kuwano et al. |
| 6,456,384 B1 | 9/2002 | Kulawiec et al. |
| 6,492,634 B2 * | 12/2002 | Marchitto et al. .......... 250/221 |
| 6,496,253 B1 | 12/2002 | Vokhmin |
| 6,509,967 B1 | 1/2003 | Pingel et al. |
| 6,564,166 B1 | 5/2003 | Ume et al. |
| 6,961,443 B2 * | 11/2005 | Mahbub ................ 382/100 |
| 2002/0057438 A1 | 5/2002 | Decker |
| 2002/0125435 A1 | 9/2002 | Gierczak et al. |
| 2005/0002544 A1* | 1/2005 | Winter et al. ............. 382/104 |

FOREIGN PATENT DOCUMENTS

| | | |
|---|---|---|
| DE | 10202660 A | 7/2003 |
| EP | 1065521 A | 1/2001 |
| JP | 01232497 A * | 9/1989 |
| WO | WO 98/47117 | 10/1998 |
| WO | WO 00/70303 A | 11/2000 |

OTHER PUBLICATIONS

International Electrotechnical Commission (IEC): "Development for the International Standards in the field of Safety of Machinery—A vision-based protective device (VBPD)"; Oct. 01, 2001; The Japanese National Commision for IEC/TC44.

Ridha M. Hamza et al., U.S. Appl. No. 09/716,002, filed Nov. 17, 2000, entitled, "Object Detection."

Darren D. Cofer, et al., U.S. Appl. No. 60/275,879, filed Mar. 14, 2001, entitled, "Safety Camera."

* cited by examiner

METHOD AND APPARATUS FOR DETECTING OBJECTS USING STRUCTURED LIGHT PATTERNS

This application is a continuation-in-part of U.S. patent application Ser. No. 10/052,953, filed Jan. 17, 2002, entitled METHOD AND APPARATUS FOR DETECTING OBJECTS, now U.S. Pat. No. 6,841,780, which claims priority under 35 U.S.C.§119(e)(1) to U.S. Provisional Patent Application Ser. No. 60/262,925, filed Jan. 19, 2001, and entitled OBJECT DETECTION USING MOIRÉ INTERFERENCE, which are both incorporated by reference herein in their entirety. This application is related to U.S. patent application Ser. No. 09/716,002, filed Nov. 17, 2000, entitled OBJECT DETECTION, U.S. Provisional Application No. 60/275,879, filed Mar. 14, 2001, entitled SAFETY CAMERA, and U.S. patent application Ser. No. 09/981,928, filed Oct. 16, 2001, entitled OBJECT DETECTION, which are all incorporated by reference herein in their entirety.

FIELD

The present invention relates to object detection, and more specifically, to object intrusion and/or presence detection within a monitored area or region.

BACKGROUND

Motion detection and object detection systems are well known in the art. Frequently, such systems monitor a user-defined area to detect when an object enters or passes through a monitored area. Such systems typically include an image capture device (such as a video camera or still camera) capable of capturing an image of the monitored area and, if required, a device for digitizing the captured images. The digitized images are analyzed in an attempt to detect whether an object has entered the monitored area. There are many different known methods and algorithms for analyzing digitized images for determining when an object has entered a monitored area. One of the most common methods is generally referred to as a change detection method.

Change detection is often accomplished by examining the difference between a current live image and a reference image, where the reference image contains only the static background of the monitored area. A reference image can be thought of as a representation of the monitored area as it would appear if no transitory objects were in view. Change detection algorithms often take two digitized images as input and return the locations in the field of view where differences between the images are identified.

Object detection systems are commonly used in environments that have dynamic lighting conditions. For example, in industrial settings, moving shadows can be cast on a monitored area or region, which can cause significant changes in ambient lighting conditions. Many existing object detection systems, including those that use change detection algorithms to detect objects, can be challenged by such shadows and/or other dynamic lighting conditions.

SUMMARY

The present invention overcomes many of the disadvantages of the prior art by providing an object detection system that is less susceptible to dynamic lighting conditions, and/or more sensitive to three-dimensional object motion and/or presence. This is preferably accomplished by projecting one or more patterns onto the monitored area, capturing one or more live images of the monitored area including the one or more patterns, and detecting objects in the monitored area by detecting changes in the one or more patterns in selected captured images.

In a first illustrative embodiment of the present invention, a pattern is projected onto the monitored area. One or more live images of the monitored area are then captured at selected times, and analyzed to detect changes in the projected pattern. The changes in the pattern may indicate a topographical change in the monitored area, and thus the entry or movement of an object in the monitored area. Because the pattern is projected onto the monitored area, changes in the ambient lighting conditions may have less effect on the efficacy of the object detection system. In some embodiments, the projected pattern is provided at a wavelength which will not be affected or at least substantially affected by ambient lighting. For example, a near infrared or infrared wavelength may be chosen since such wavelengths are not as strongly affected by visible light variations in the region of interest if the visible lighting in an area changes. The particular pattern may vary widely, and may be static or dynamic. Additional variations and embodiments are further explained below.

In another illustrative embodiment, an object detection system includes a step of providing an unequal illumination pattern to an area to be monitored, where the unequal illumination pattern contains a predictable pattern. At the same time, an image of the area to be monitored is captured, and data analysis is performed to determine whether the captured image contains the predicted pattern. The predictable pattern may be considered to be a form of data, and the monitoring of the area comprises a determination of the extent to which the data cast in the illumination pattern is altered as measured by the capture of the image. As such, the illustrative embodiment relies not only on the area to be monitored to provide data for analysis, but also uses the illumination pattern to observe additional data. The information in the illumination pattern does not necessarily arise from activity within the field of view of the image capture apparatus, which may be, for example, a camera. Thus events outside the field of view of the image capture apparatus may be monitored by the present invention.

DETAILED DESCRIPTION

The following description should be read with reference to the drawings wherein like reference numerals indicate like elements throughout the several drawings. The detailed description and drawings represent select illustrative embodiments and are not intended to be limiting. The figures are not necessarily shown to scale.

The present invention provides an object detection system that may be less susceptible to dynamic lighting conditions, and/or may be more sensitive to object motion and/or presence than prior art systems. The system is also sensitive to three-dimensional extraneous objects that intrude into the monitored area. This may be accomplished by, for example, projecting one or more static or dynamic patterns on the monitored area, capturing one or more images of the monitored area including the one or more patterns, and detecting objects in the monitored area by detecting changes in the one or more patterns in selected captured images.

Figure 1A:
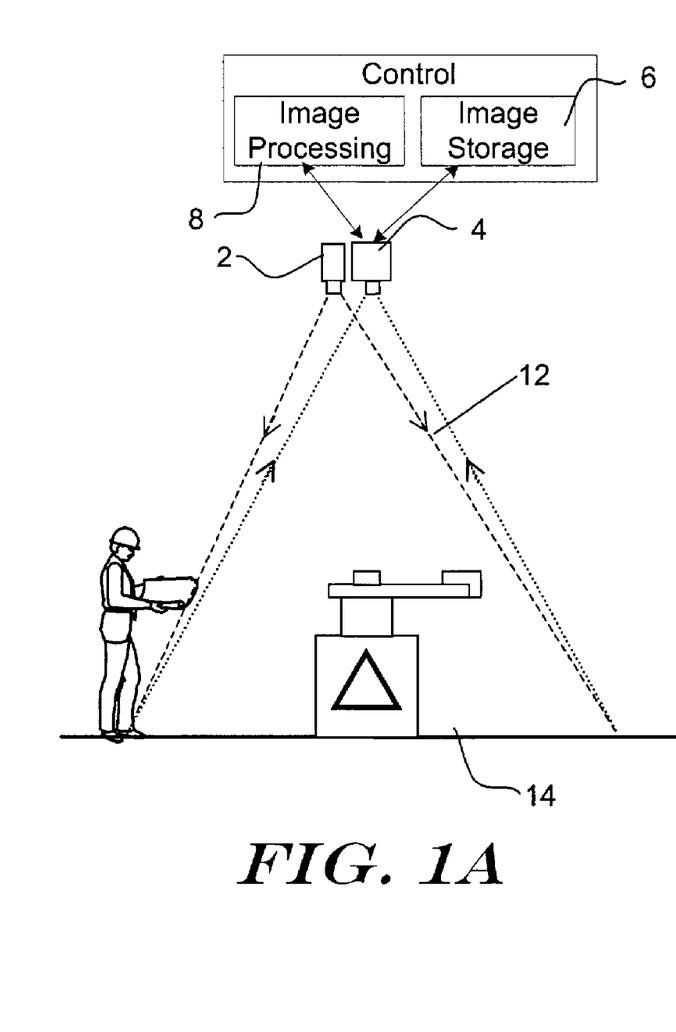
FIG. 1A is a schematic diagram showing an illustrative object detection system in accordance with one embodiment of the present invention.
Figure 1B:
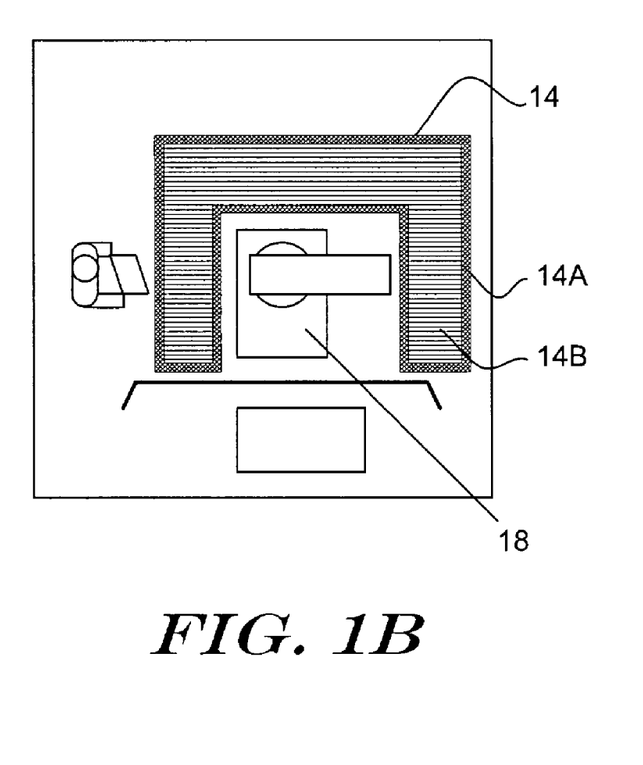
FIG. 1B is an overhead view corresponding to an image captured by the illustrative object detection system of FIG. 1A.

FIGS. 1A–1B are schematic diagrams showing a first illustrative object detection system in accordance with the present invention. The illustrative object detection system of FIG. 1A includes an illumination source 2, an image capture device 4, an image storage device 6, and a processing device 8. In some embodiments, the illumination source 2, image capture device 4, image storage device 6, and processing device 8 are integrated into a common device, while in other embodiments, separate devices are provided, as desired.

The illumination source 2 is located above a monitored area 14, such as near a ceiling. The illumination source 2 illuminates the monitored area 14 with a desired pattern 12. The pattern 12 may be generated by, for example, projecting through a patterned grating, projecting interference patterns where the interference fringes are formed by a phase or wavelength shift, projecting a pattern using a scanning mechanism, or any other suitable method. As shown in FIG. 2B, the monitored area 14 may include an alarm zone 14A and safety zone 14B, where the system is configured to set off an alarm if the alarm zone 14A is entered, and the system shuts down the device 18 if the safety zone 14B is entered.

For several embodiments of the present invention, a static or dynamic pattern may be generated having a number of dots or other spatially defined elements created by providing a collimated light source (i.e. a laser source) as illumination source 2, diffusing or splitting the output of the illumination source 2, and directing the diffused or split light output through an aperture array. The apertures in the array may vary in size or shape to improve the resultant pattern on the monitored area 14. For example, given a centrally located illumination source 2, apertures near the edges of an aperture array may be made smaller, since a greater distance may be covered and hence greater dispersion of the output portion passing through the smaller apertures will occur. If, instead, the illumination source 2 were placed on one side of the monitored area 14 (which configuration is not shown in FIG. 1A), with the image capture device 4 on an opposing side of the monitored area 14, the apertures may vary from smaller to larger across the aperture array. The distances covered may be sufficiently small in many applications that dispersion of the output will be minimal, and variation of aperture sizes will not be desired or will have nominal effect.

The illumination of the monitored area 14 may be modulated to prevent any adverse effects of continuous illumination over a long period of time. Such continuous illumination may, for example, cause physical changes in the surface beneath the monitored area 14. Modulation may also allow for the use of a higher intensity illumination source 2 without creating difficulties with heating of the monitored area 14.

The pattern may be static or dynamic. A dynamic pattern is one where the spatial position of the light areas and dark areas changes over time, and in general the movement is periodic in nature. One possible use of a dynamic pattern is to increase the effective detection resolution of the system by preventing an object from "hiding" between illuminated portions of a static pattern.

One way to realize a dynamic moire pattern is to project an interference pattern from a Mach-Zender interferometer, which may include a mirror on a piezo-actuator. The frequency of movement of the mirror may determine the frequency of interference fringe movement. A simpler dynamic pattern may also be realized by using a moving aperture array element. For example, with a centrally located illumination source 2, a pattern of dots may be used as an aperture array element to create a pattern; rotating or otherwise moving the aperture array element can then create a dynamic pattern.

It is contemplated that the monitored area 14 may be rectangular, round, or any other shape, as desired. As shown in FIG. 1B, the illustrative monitored area 14 extends around three sides of a machine 18. Definition of the shape and extent of the monitored area 14 may be performed in data processing (by ignoring data from un-monitored areas), light reception (by use of a mask, for example, or by providing a limited array of light detectors), or illumination (by use of light-shaping devices such as a mask).

It is contemplated that the illumination source 2 may be any type of illumination source capable of projecting a desired pattern on the monitored area 14. Examples of suitable illumination sources 2 include an incandescent or fluorescent lamp with a patterned mask and illumination optics. Other examples of suitable illumination sources 2 include a lasing source such as a modulated light-stripe illumination module, or a laser diode source uniformly illuminating a patterned grating with the grating re-imaged onto the monitored area with an objective projection lens. A suitable illumination source 2 may also be an infrared source. Using a portion of the spectrum not ordinarily found in or subject to wide variation in the ambient lighting conditions, such as the near infrared, may help keep the projected pattern from being overwhelmed by ambient light, and may also help enhance the differentiation between the projected pattern and other sources of light in the environment. The image capture device may be a sensor (CCD, photodiode, or the like) that is attuned to a desired spectrum, such as the spectrum of the illumination source.

In a further embodiment, multiple wavelengths may be used simultaneously, where the use of the two or more wavelengths may help detect whether a change is a result of a variation in the ambient environment that affects one wavelength more than another. For example, if a change is observed at one wavelength but not the other, the change may be attributed to an ambient condition, rather than an intrusion. Such a variation may also be adapted depending upon the type of intrusions which are anticipated or which are permissible. For example, if an intrusion by an object having a known spectroscopic signature is to be allowed, then the use of two wavelengths may allow objects generally to be detected, while allowing objects having known and anticipated absorbing effects to be ignored. The multiple wavelengths may each be given distinct patterns or dynamic features as well.

The illumination source 2 preferably projects at least one pattern on the monitored area 14. The pattern used may depend on the particular application at hand. For example, in one illustrative embodiment, the pattern may be any pattern that has transitions between areas that have illumination (e.g. light areas) and areas that lack illumination (e.g. dark areas). Generally, the maximum distance between the centroids of illuminated area should be no more than one half the size of the smallest object for which detection is desired, although this is not required. Examples of suitable patterns included striped or checker board patterns where illuminated and non-illuminated areas alternate. Another suitable pattern is one in which a collection of dots are defined against a general background, with either the dots or the background being the illuminated area. It should be noted that the figures are not necessarily drawn to scale and the particular resolutions, sizes and features described below are merely illustrative and not intended to be limiting.

In an illustrative embodiment, once the monitored area 14 is illuminated the image capture device 4 captures a reference image of the monitored area 14. The reference image is preferably an image of the monitored area 14 with no transitory objects in the monitored area 14. The reference image is preferably stored, at least temporarily, in the image storage device 6. A new reference image may be captured periodically, if desired. Once a reference image is captured, the image capture device 4 may capture successive live images of the monitored area 14, preferably at a selected time interval. Like the reference image, the live images are preferably stored, at least temporarily, in the image storage device 6. The image storage device 6 may provide the reference image and the live images to the processing device 8 for processing.

The processing device 8 preferably analyzes the live images to detect changes in the illuminated pattern. In some embodiments, the monitored area is divided into a number of image segments called mask windows. The size of each mask window is preferably chosen so that it is no bigger than the approximate size of the smallest object for which detection is desired. While objects smaller than the mask window may be detected, the probability of detecting such objects decreases with object size. The position of the various mask windows may be chosen so that the entire area to be monitored is covered by overlapping mask windows. The image area that corresponds to each mask window may be analyzed separately for object detection, if desired. In addition, it is contemplated that the analysis method that is used to analyze the various mask windows may differ across the image, and the triggered response may vary depending on which mask window detects an object, if desired.

The comparison between a reference image and a live image can be accomplished in any number of ways. One method is to simply do a pixel-by-pixel comparison of the projected pattern in the images. If there is no entry or movement of objects in the monitored area, the projected pattern in the two images will substantially cancel out. However, if there is entry or movement of an object in the monitored area, part of the projected pattern shown in one image may be shifted or otherwise deformed relative to the pattern shown in the other image. A threshold value may be used to help determine if there is a sufficient difference between the reference image and a live image to indicate a detected object, as further described below.

Another method for comparing one image to another is to calculate a difference between the value of the brightness levels corresponding to the light areas of the pattern (such as in a mask window), and the value of the brightness levels corresponding to the dark areas in the mask window of the reference image. A similar calculation may be made for the mask windows of a live image. Whenever the second calculation is different from the first calculation by a specified amount, a change may be inferred. A further discussion of this and other methods for comparing images is included in co-pending U.S. patent application Ser. No. 09/716,002 entitled OBJECT DETECTION, which is incorporated herein by reference.

Yet another method for comparing one image to another is to measure a correlation between each pixel and some neighboring pixels and/or a correlation between selected features, and then compare the correlation values. Whenever the correlation values are different by a specified amount, a change may be inferred. Alternatively, or in addition, the image analysis may extract the moire spatial frequency and phase using a Fourier transform. Other image analysis techniques may also be used, such as, for example, unsharp masking, thresholding, contrast segmentation, filtering processing, skeletonization processing, multi-resolution analysis, deformable contour modeling, image clustering, morphology, etc. These comparison methods are meant to be only illustrative, and any suitable method may be used to compare selected characteristics of the images, depending on the application.

It is also contemplated that the reference and/or live images may be preprocessed before they are compared. For example, the reference image and/or live images may be provided to a filter that helps removes speckle, provides smoothing, changes overall intensity, or otherwise cleans-up the images. In one illustrative example, the images may be modified to reflect changes in ambient light intensity by, for example, taking into account the average received intensity across an entire image.

Changes that are detected in the illuminated pattern may indicate a topographical change within the monitored area 14, and thus entry or movement of an object in the monitored area 14. When an object is detected, the processing device 8 may sound an alarm, shut down the machine 18, and/or provide some other alarm or action. Images of the monitored area with the detected object present may be retained for subsequent analysis, and/or sent to a monitoring station if desired.

Figure 2A:
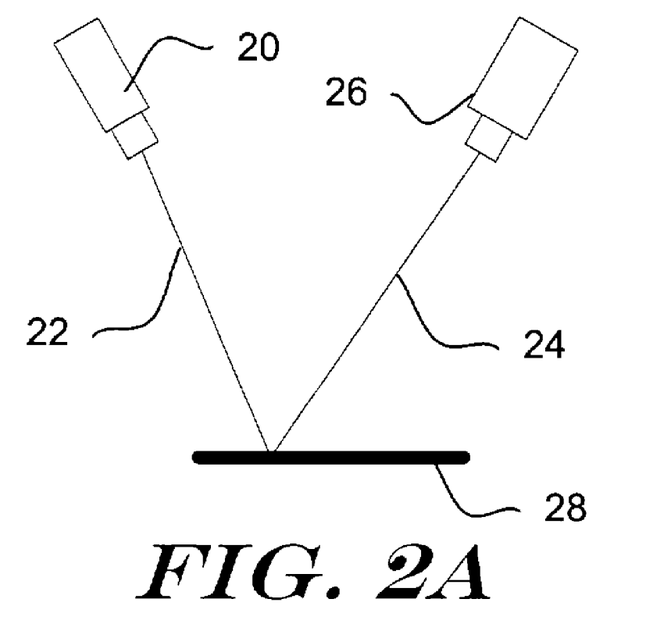
FIG. 2A is a schematic diagram showing an illustrative object detection system in accordance with another embodiment of the present invention.
Figure 2B:
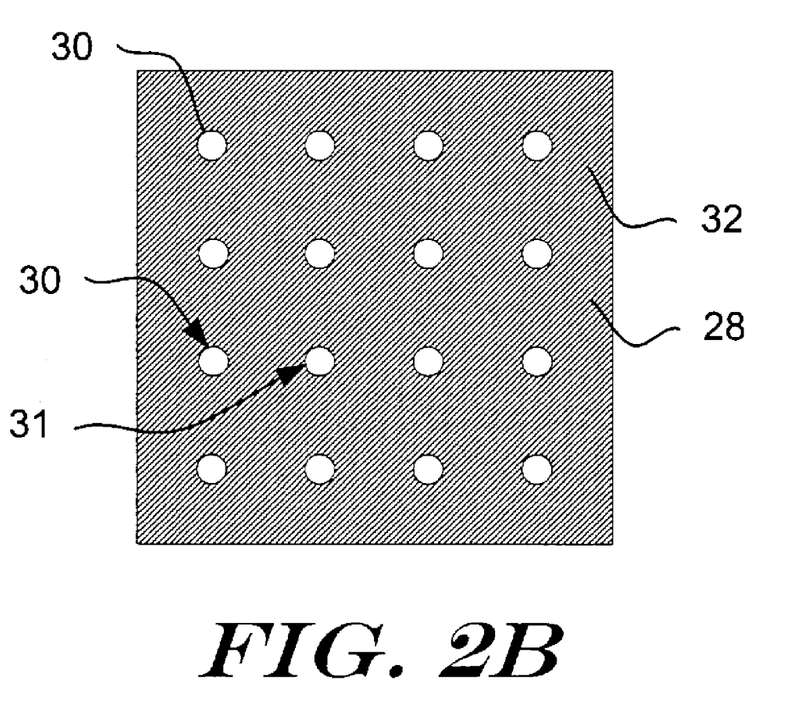
FIG. 2B is an overhead view corresponding to an image captured by the illustrative object detection system of FIG. 2A.

FIGS. 2A–2B and 3A–3B are schematic diagrams of another illustrative embodiment. FIG. 2A illustrates an approximation of the operation of an illustrative embodiment. An illumination source 20 projects an output 22 to a location on a surface 28 beneath an area of interest. The operation of the illumination device and the form of the output 22 may be generally as described above. The output 22 strikes the surface 28 and a reflected portion 24 is received by an image capture device 26. It should be noted that the several Figures herein are not intended to be ray tracing diagrams, and instead generally show light paths which may also rely on dispersion effects. Thus the reflected portion 24 is merely a part of the incident light which is shown as output 22.

FIG. 2B is a schematic diagram of a representative image captured by the image capture device 26. FIG. 2B shows an illustrative illumination pattern including several dots 30, 31. The surface 28 is illuminated in several bright areas 30, 31, while other portions of the surface 28 are represented as a dark portion 32. The pattern shown in FIG. 2B, because no interfering objects are in the area of interest over the surface 28, may be treated as a reference image pattern.

Figure 3A:
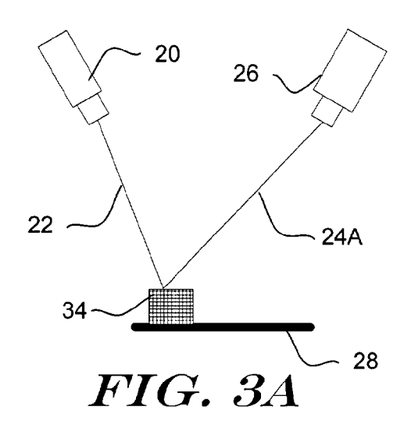
FIG. 3A is a schematic diagram showing an illustrative object detection system in accordance with yet another embodiment of the present invention, this time illustrating an object in the field of view of an image capture apparatus.
Figure 3B:
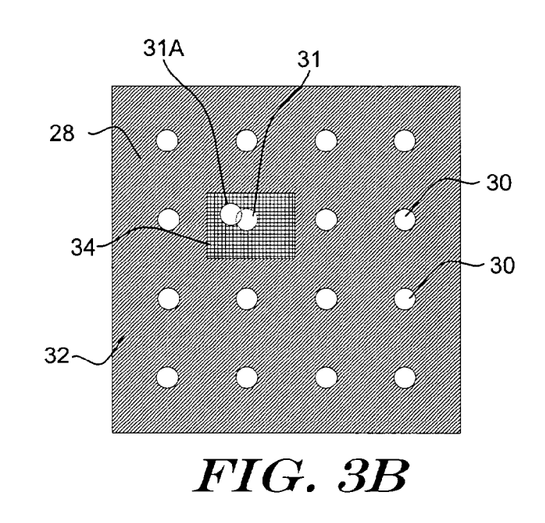
FIG. 3B is an overhead view corresponding to an image captured by the illustrative object detection system of FIG. 3A.

FIG. 3A shows the illustrative embodiment of FIG. 2A, this time including an object 34 placed on the surface 28. The illumination device 20 again produces an output 22, but this time the output 22 strikes the object 34 and a reflected portion 24A reflects from the object 34 toward the image capture device 26. FIG. 3B illustrates the effect of the object 34 on the data received by the image capture device 26. In particular, while most of the bright areas 30 remain the same, one of the bright areas has moved from an original bright area 31 (shown in dashed lines) to an altered bright area 31A.

Figure 4A:
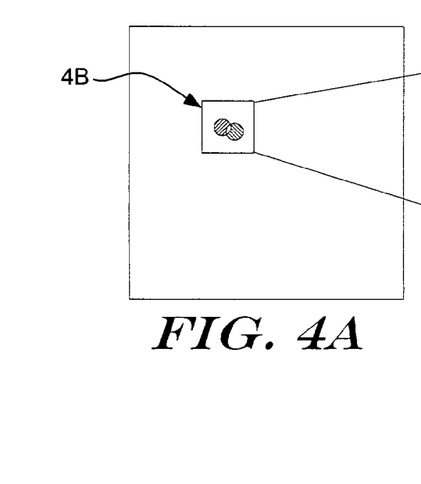
FIGS. 4A–4C illustrate a simplified subtraction algorithm which may be used for object detection with some embodiments of the present invention.
Figure 4B:
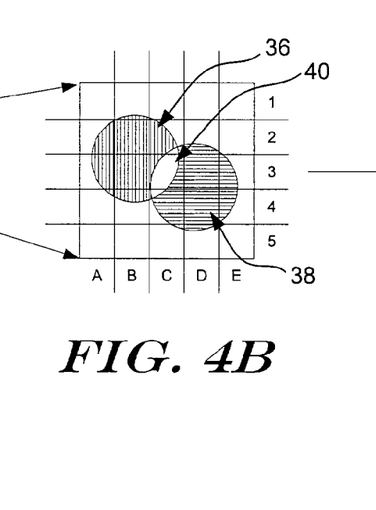
Figure 4C:
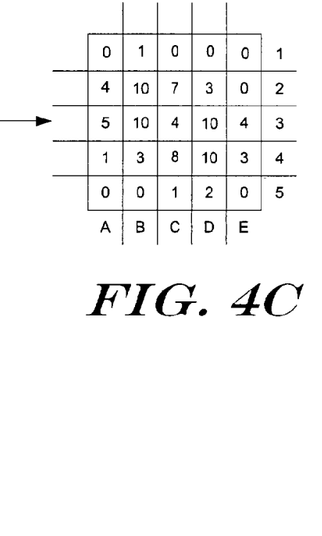

The reference pattern in FIG. 2B and the received pattern in FIG. 3B may then be used as illustrated in FIGS. 4A–4C, which show a simple subtraction comparison. By subtracting the image of FIG. 2B from the image of FIG. 3B, one would obtain a result as shown in FIG. 4A. The field is clear except for a portion designated 4B, which is expanded and shown in FIG. 4B. FIG. 4B also illustrates a grid having numbers and letters for indicating individual pixels. The subtraction results in a first region 36 indicating greater light in the received pattern, and a second region 38 indicating greater light in the reference pattern. An intersection of the dots 31, 31A (FIG. 3B) results in another region 40 in which the light in both patterns is about the same.

It can be seen that the pixels may not exactly correspond in shape or position to the regions 36, 38. In an actual system, the individual pixels would be sensed individually and either subtracted in analog or digital fashion, where each pixel is represented as a value of light received represented in terms of a voltage, for example for analog subtraction, or in terms of a number value generated by analog-to-digital conversion (ATD) for a digital subtraction. If subtraction occurs using analog methods, an ATD step may follow the subtraction to yield results as schematically demonstrated in FIG. 4C. Each pixel, after the subtraction step, is given a value representing the magnitude of the difference between the reference image and the received image. Threshold values are then set for determining whether an intrusion has occurred.

The steps for comparing a received image to a reference image are known in the art, and any acceptable methodology may be used. The method illustrated by FIGS. 4A–4C is merely provided for the purpose of illustration.

Figure 5A:
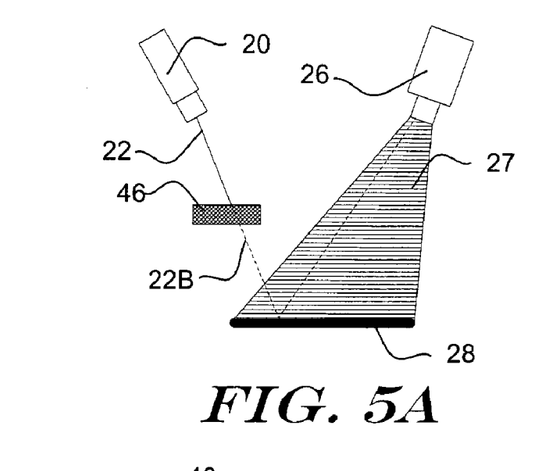
FIG. 5A is a schematic diagram showing an illustrative object detection system in accordance with yet another embodiment of the present invention, this time illustrating the detection of an object outside of the field of view of an image capture apparatus.
Figure 5B:
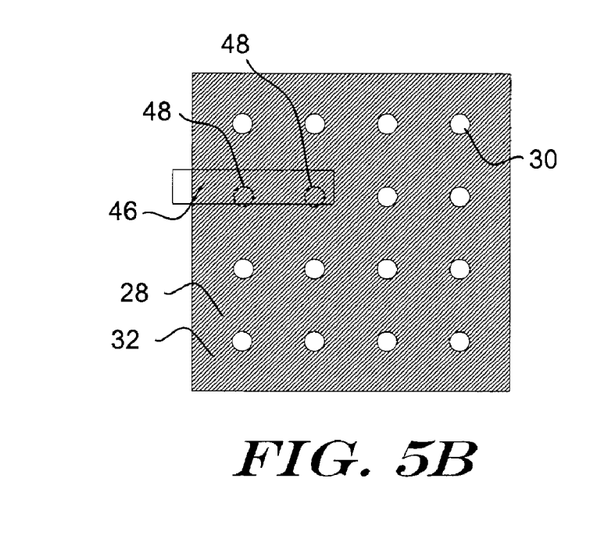
FIG. 5B is an overhead view corresponding to an image captured by the illustrative object detection system of FIG. 5A.

FIGS. 5A–5B show an illustrative embodiment in which an object is detected even though it does not fall within the field of view of the image capture apparatus. The basic set-up is similar to that of FIGS. 2A and 3A, with an illumination device 20 producing an output 22. However, an object 46, which may represent, for example, the arm of a person, is in the path of at least part of the output 22. A portion 22B of the output 22 is blocked by the object 46 and does not reach the capture apparatus 26. In addition, the image capture apparatus 26 has only a limited field of view 27, and the object 46 is outside the field of view 27. Even so, as shown in FIG. 5B, a void is created by the object 46 which blocks out certain of the dots 30 in the received image. The background level 32 is captured where missing dots 48 (shown in phantom) would otherwise be. The illustrative embodiment of FIGS. 5A–5B shows how a system may sense an object in a defined space without actually observing the object in a field of view. Because the volume being monitored need not be entirely within the field of view of the image capture device(s), a greater volume may be monitored by a image capture device having a smaller field of view than may be required with prior systems.

Figure 6A:
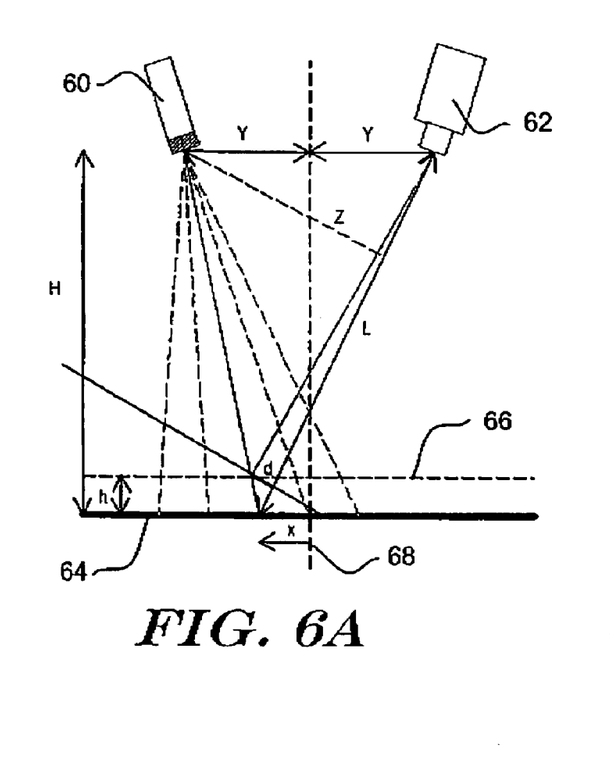
FIGS. 6A–6B are schematic diagrams including a number of identified lines to aid in explaining a first illustrative analysis of pixel displacement.

FIG. 6A is a schematic representation illustrating one method of detecting and determining dot displacement for an illustrative example. An illumination device 60 and an image capture device 62 are illustrated for monitoring a region of interest over a surface 64. A dashed line 66 represents the height h of an object placed on surface 64. A center line 68 is defined halfway between the illumination device 60 and the image capture device 62.

Figure 6B:
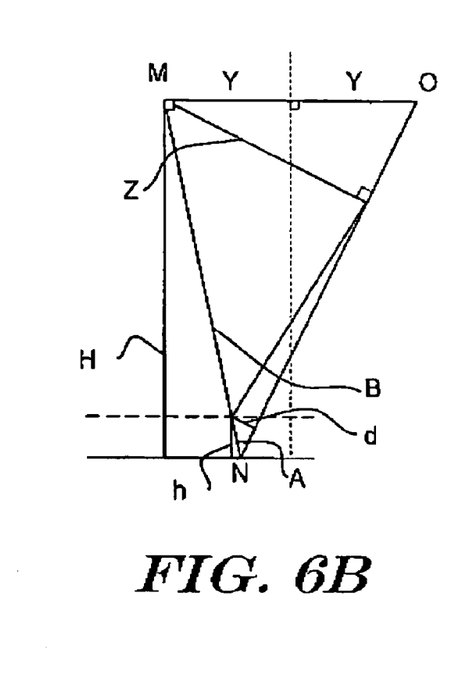

FIG. 6B aids in showing by simple geometry with similar triangles the following:

$$\frac{H}{h} = \frac{B}{A} = \frac{Z}{d}$$

The area of the triangle MNO can be written in two ways:

$$\frac{Z*L}{2} = \frac{H*2Y}{2} = \text{Area}$$

Then:

$$d = \frac{h*Z}{H} = \frac{h*Z*L}{H*L} = \frac{2h*Y}{L}$$

Using FOV as the field of view, one writes:

$$\frac{L}{FOV} = \frac{\text{focal\_length}}{\text{imager\_size}}$$

Then:

$$\frac{d}{FOV} = \frac{2Y*h*\text{focal\_length}}{L^2 * \text{imager\_size}}$$

Treating x as the location of the pixel going to the left on FIG. 6, the Pythagorean theorem states that:

$$L^2 = (Y+x)^2 + H^2$$

Then the following results:

$$\text{pixel\_shift} = \text{pixels\_in\_FOV} * \frac{d}{FOV} = \frac{2Y * h * p_x * (\text{focal\_length})}{((Y+x)^2 + H^2) * w_x}$$

Where $p_x$ represents the number of pixels in the field of view in the x-direction, and $w_x$ represents the imager size in the x-direction. It can be seen that as x increases (i.e. the disturbance occurs farther away from the center of the field of view), the pixel shift is reduced.

For example, given H=3.0 meters, h=40 millimeters, Y=1.0 meters, focal length=3.6 millimeters, imager size=4.8 mm, and pixels=480, then at x=0, the pixel shift is 2.88. Thus, an illumination feature (such as a portion of a dot) that would have been sensed at one location without the object having h=40 millimeters would be sensed 2.88 pixels away. Optimal detection will occur when the angle between illumination device and the image capture device is 90 degrees. As can be seen from the above formula for pixel shift, one would seek to maximize Y and minimize H to achieve better sensitivity; however, it should be noted that distortion will increase as Y gets larger relative to H, so there is a tradeoff to take into consideration.

As a further example, if the data processing system associated with a particular safety camera can reliably detect or sense a shift of a single pixel across a border from light to dark in a pattern, a pixel shift of 1.0 may be used as a detection threshold. Then the following formula may be used to determine how far above the surface 64 an object must be (or if the object lies on the surface 64, how thick the object must be) to be detected reliably for the illustrative system:

$$h = \frac{\text{pixel\_shift} * w_x * ((Y+x)^2 + H^2)}{2Y * p_x * (\text{focal\_length})}$$

If H=3.0 meters, Y=1.0 meters, focal length=3.6 millimeters, imager size=4.8 mm, and pixels=480, using pixel shift of 1.0 and assuming that the region of interest which will be monitored has borders that are 1 meter away from the center of the camera field of view such that x is less than or equal to 1 meter, then the minimum value for h which will be reliably detected at any place in the region of interest is 1.8 centimeters. The actual values at any given location in the region of interest will vary, with even thinner objects detected toward the center of the region (as x goes to zero, h becomes smaller) More sensitive electronics or data treatment schemes may allow for use of lesser pixel shift minimum values to achieve higher overall sensitivity to objects which are quite near the ground. Note also that the 1.8 centimeter value is actually the minimum height or level for an object entering sensed in the region of interest. Thus a very thin item such as a piece of paper which enters the region of interest some distance greater than 1.8 centimeters above the surface 64 can be sensed regardless of how thick it is.

Figures 7A, 7B, 7C:
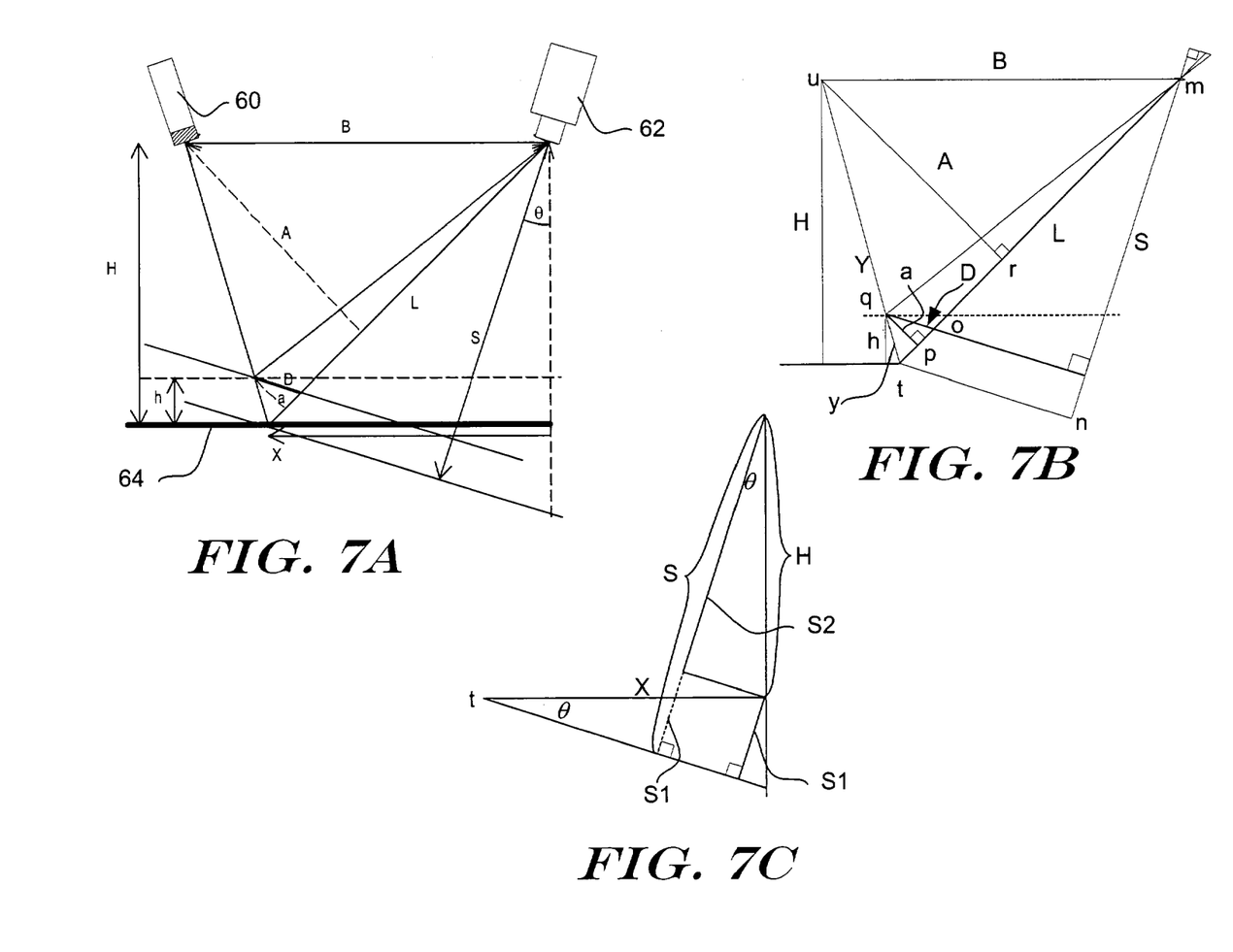
FIGS. 7A–7D are schematic diagrams including a number of identified lines to aid in explaining a second illustrative analysis of pixel displacement.
Figure 7D:
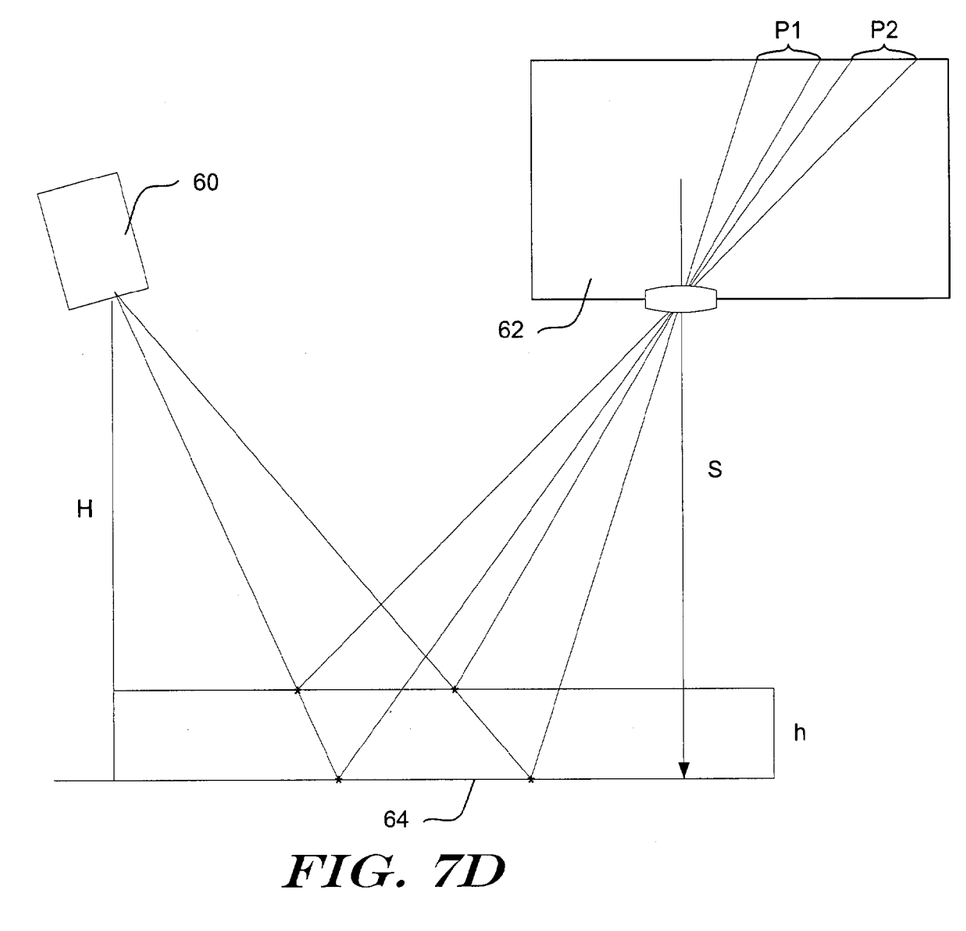

FIG. 7A is another schematic representation illustrating another method for detecting and determining the extent of an intrusion into a region of interest. FIGS. 7B–7D aid in the understanding of the geometric approach to understanding the schematic of FIG. 7A. Note that in FIGS. 7A–7D, line S is the fixed center axis for the image capture device, with θ being the angle between the fixed center axis for the image capture device and a line normal to the surface 64.

The analysis for FIGS. 7A–7D uses D as the dot displacement perpendicular to the camera axis. Referring to FIG. 7B, triangle mnt is similar to triangle qpo, given that each is a right triangle and taking advantage of the parallelism of the lines that define line D and line nt. Therefore:

$$\frac{D}{a} = \frac{L}{S}$$

Then, using similar triangles again:

$$\frac{A}{Y} = \frac{a}{y} \text{ and } \frac{H}{Y} = \frac{h}{y}$$

Therefore:

$$\frac{H}{h} = \frac{Y}{y} = \frac{A}{a}$$

Also, the area for triangle utm may be written two ways:

$$\text{Area}(utm) = \frac{A*L}{2} = \frac{H*B}{2}$$

So therefore:

$$D = \frac{a*L}{S} = \frac{A*h}{H} * \frac{L}{S} = \frac{H*B*h}{S*H} = \frac{B*h}{S}$$

Using focal length=s and image displacement=d, the similar triangles on opposing sides of a lens will yield:

$$\frac{d}{s} = \frac{D}{S}$$

So then:

$$d = \frac{D*s}{S} = \frac{h*B*s}{S^2}$$

Next, referring to FIG. 7C, it can be seen that line S has been divided into two portions, S1 and S2. Taking advantage of the rule of similar triangles again, the two angles labeled θ are equal angles. Both lines labeled S1 are of equal length as well, since the lines are opposing lines on a rectangle. Using the definitions of sine and cosine, then, $$S = S1 + S2 = H*\cos\theta + X*\sin\theta$$

Using p as pixel displacement, w as imager size, and n as pixel count, $$p = \frac{d}{w} * n = \frac{n * h * B * s}{w * S^2} = \frac{n * h * B * s}{w * (H * \cos\theta + X * \sin\theta)^2}$$

If the camera is aligned such that $\theta=0$, the X term drops out and leaves:

$$p = \frac{n * h * B * s}{wH^2}$$

This result is illustrated in FIG. 7D, where it can be seen that the two displacements P1, P2 shown within an image capture device 62 are the same size, even though generated at different locations. The displacements P1, P2 will remain equal as long as the reflection is from the same height above the surface 64 and the illumination source 60 remains in the same location. The result implies that, with the image capture device 62 placed such that the camera or lens axis is perpendicular to the surface 64, there is no distortion of the received image that depends upon the distance X from the axis. Other sources of distortion may remain present, but at least this one source may be eliminated.

For an illustration, if height H=3.0 meters, object height h=40 millimeters, separation B=2.0 meters, focal length s=3.6 millimeters, imager size w=4.8 millimeters, and pixel count n=480, with $\theta=0$ then p=3.2 pixels of pixel shift. With this newer formulation, using $\theta=0$ allows a more simple determination of the minimum height at which an object can be detected, because the calculation does not require allowing for different pixel displacements depending on position. For example, regardless of the value of X, with $\theta=0$, using p=1 as a threshold and with H=3.0 meters, B=2.0 meters, s=3.6 millimeters, w=4.8 millimeters, and n=480, the minimum height at which an object can be detected would be calculated by:

$$h = \frac{p * w * H^2}{n * B * s}$$

Which results in h=12.5 millimeters for a minimum height at which an object will be detected reliably using p=1 as a threshold for reliable detection by electronics.

Figure 8:
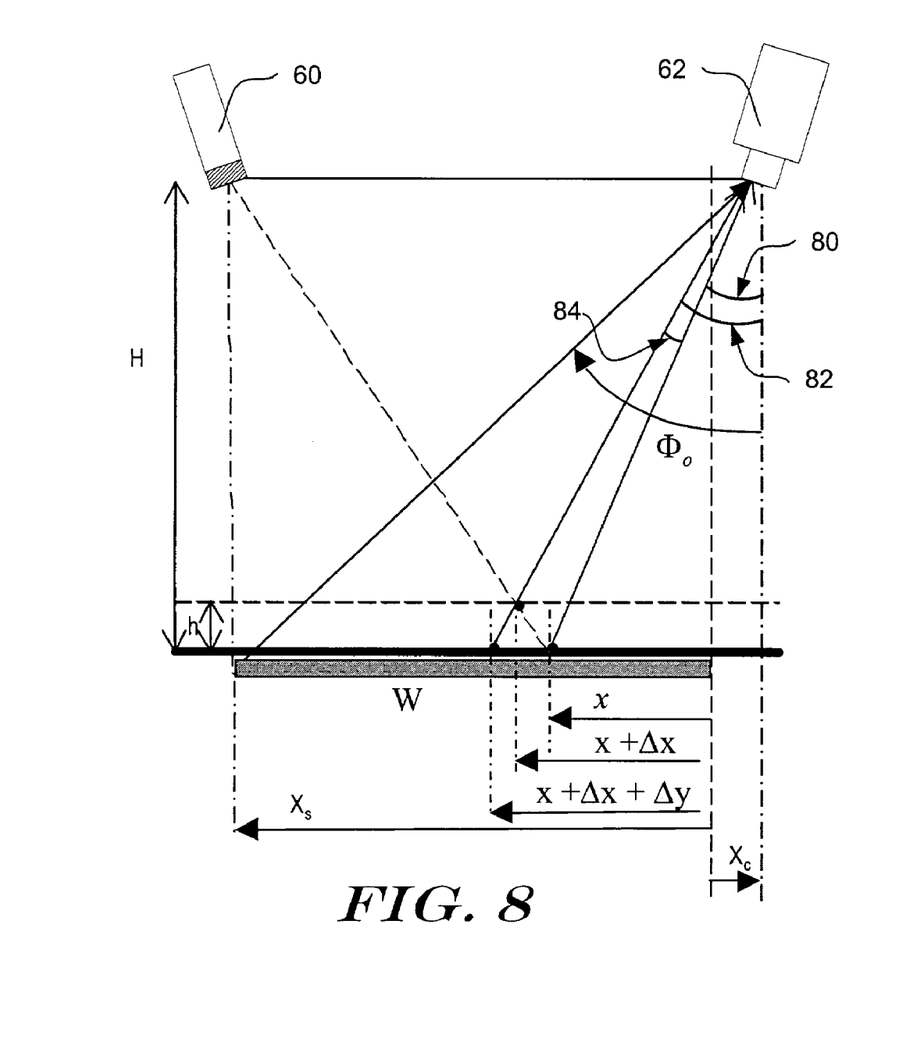
FIG. 8 is a schematic diagram including a number of identified lines to aid in explaining a third illustrative analysis of pixel displacement.

FIG. 8 is a schematic diagram including a number of identified lines to aid in explaining a third illustrative analysis of pixel displacement. FIG. 8 may be useful in setting the sensitivities of analytical analysis by providing a framework for determining the minimum pixel shift that should be sought. As shown in FIG. 8, an illumination source 60 illuminates an area 64 and images are captured with an image capture apparatus 62. The image capture apparatus 62 is displaced a distance $X_c$ from the edge of the area 64. An object having a height h is to be imposed over the area 64. The area 64 has a width W.

The image capture apparatus 62 captures images across an area defined by the angle $\Phi_0$ from the position of the image capture apparatus 62 to the far edge of the area 64. As such the angle $\Phi_0$ may be defined by the following formula (note $X_c$ is treated as negative when measured as illustrated):

$$\tan(\Phi_0) = \frac{W - X_c}{H}$$

Three angles 80, 82, 84 are defined by the imposition of an object with the height h. The first angle 80 is the initial angle formed at a location x with respect to the image capture apparatus 62 and a vertical axis, and can be defined by:

$$\tan(Angle_{80}) = \frac{x - X_c}{H}$$

The second angle 82 is the larger angle formed by the new reflection from a height h and can be defined in two ways, the latter being the simpler:

$$\tan(Angle_{82}) = \frac{x + \Delta x + \Delta y - X_c}{H}$$

The third angle 84 is the difference between these first two. Using these angles and the number of pixels N, a pixel shift p may be defined as:

$$p = N\frac{Angle_{84}}{\Phi_0} = N\frac{\tan^{-1}\left(\frac{x + \Delta x + \Delta y - X_c}{H}\right) - \tan^{-1}\left(\frac{x - X_c}{H}\right)}{\tan^{-1}\left(\frac{W - X_c}{H}\right)}$$

Now, let z equal:

$$z = x + \Delta x + \Delta y$$

Using simple geometry, the following two equations are readily calculated.

$$\Delta x = h\frac{X_s - x}{H} \text{ and } \Delta y = H\frac{(z - X_c)}{H}h$$

Thus, $$z = x + \frac{h}{H - h}(X_s - X_c)$$

To further simplify the expression, one may use the following expression:

$$\Delta x + \Delta y = \frac{h}{H}(z - X_c - X_s - x) = \frac{h}{H}(\Delta x + \Delta y + x - X_c + X_s - x)$$

This can be simplified to:

$$(\Delta x + \Delta y)\left(1 - \frac{h}{H}\right) = \frac{h}{H}(X_s - X_c)$$

And, $$(\Delta x + \Delta y) = \frac{h}{H - h}(X_s - X_c)$$

Making a substitution in the original equation for z above results in:

$$z = x + \frac{h}{H - h}(X_s - X_c)$$

Now, substituting $x+\Delta x+\Delta y$ for z in the equation for p given above yields:

$$p = N \frac{\tan^{-1}\left(\frac{z - X_c}{H}\right) - \tan^{-1}\left(\frac{x - X_c}{H}\right)}{\tan^{-1}\left(\frac{W - X_c}{H}\right)}$$

Using the above equations for p and z one may readily determine a desired resolution for detection of an object having a predetermined height h. For example, using N=400, h=15 mm, H=200 cm, $X_c$=−5 cm, $X_s$=105 cm, W=100 cm, and x=50 cm, then z=50.83 cm and p=3.19 is the pixel shift that would be sensed at that location given that height. Thus the data processing equipment and/or programming would need to be set up to sense a pixel shift of 3.19 or greater to detect an object fifteen millimeters high in the middle of the area of interest.

In many applications the borders of the area of interest will be where such calculations are made, i.e. when x=0 or x=W. Using the same values as above, except for x, then p=3.44 for x=0 and p=2.69 for x=W. Making $X_c$=0 improves performance by increasing the lower of the pixel shifts (pixel shift farther away from the image capture apparatus 62), so that p=3.42 for x=0 and p=2.74 for x=W. To avoid wasting pixels, the field of view should correspond to the size of the area to be monitored. Selecting the longest focal length for the image capture apparatus 62 that covers exactly the area to be monitored allows for maximum resolution with minimum distortion.

Any of a wide variety of actions may be performed in response to detection of an intruding object either individually or in combination. For example, a machine in operation in or near the area being monitored may be turned off in response to a detected intrusion. An audible or visible alarm may be sounded. A message or signal may be sent to a remote location such as a police station or other authorities. Additionally, images may be recorded in a permanent or semi-permanent fashion in response to a detected object, for example, where images are captured and discarded in a FIFO or LIFO manner, once an object is detected subsequent images may be placed into a separate memory and not discarded.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method for detecting an object in a monitored area, the method comprising the steps of:
   illuminating the monitored area with a pattern;
   capturing a live image of the monitored area, including at least a portion of the pattern; and
   detecting an object in the monitored area when a change is detected in the pattern in the live image, the change being noted by comparing a reference image showing at least a portion of the pattern to the live image to determine whether any part of the pattern has moved, been removed, or undergone some deformation; wherein the reference image and the live image each have two or more mask windows, and wherein the comparing step compares selected mask windows of the reference image to selected mask windows of the live image.

2. The method according to claim 1 wherein the detecting step detects an object in the monitored area when the change in the pattern exceeds a predetermined threshold.

3. The method according to claim 1 wherein the monitored area is illuminated with a static pattern.

4. The method according to claim 1 wherein the monitored area is illuminated with a dynamic pattern.

5. The method according to claim 1 wherein the comparing step compares the selected mask windows of the reference image and the live image using one or more comparing algorithms.

6. The method according to claim 5 wherein the comparing step compares two or more of the selected mask windows using different comparing algorithms.

7. The method according to claim 1 further comprising the step of performing a predefined action if the detecting step detects an object in one of the selected mask windows.

8. The method according to claim 7 wherein the predefined action is different depending on the mask window in which an object is detected.

9. The method according to claim 1 wherein the pattern defines a number of spaced dots.

10. The method according to claim 1 wherein the pattern defines a number of stripes.

11. The method according to claim 1 wherein the pattern is projected using an infrared wavelength of light.

12. The method according to claim 1 wherein the pattern includes at least two discrete wavelengths of light.

13. A method for detecting an object in a monitored area, the method comprising the steps of:
    illuminating the monitored area with at least one pattern using two or more wavelengths; wherein the at least one pattern includes a first pattern illuminated using a first wavelength and a second pattern illuminated using a second wavelength;
    capturing a live image of the monitored area, including at least a portion of the at least one pattern; and
    detecting an object in the monitored area by comparing the live image to a reference image, wherein a change in the pattern between the live and reference images indicates the presence of an object in the monitored area.

14. The method according to claim 13 wherein the at least one pattern comprises a number of dots.

15. The method according to claim 13 wherein the step of detecting the object in the monitored area by comparing the live image to a reference image includes making a first comparison using the first wavelength and a second comparison using the second wavelength.

16. The method according to claim 15 further comprising comparing the first comparison to the second comparison to determine whether a difference between the pattern in the live image and the pattern in the reference image is due to the object entering the area of interest.

17. A system for monitoring a volume of space, the system comprising:
- an image capture apparatus placed to capture images of a monitored area; and
- an illumination apparatus placed to illuminate the monitored area with two or more wavelengths, wherein the illumination a apparatus is adapted to project at least one different or offset pattern on the monitored area for each of the two or more wavelengths;
- wherein the volume of space monitored includes a volume corresponding to the space defined between the illumination apparatus and the monitored area; and
- wherein the volume of space monitored includes a volume corresponding to the space defined between the monitored area and the image capture apparatus.

18. A system for monitoring a volume of space, the system comprising:
- an image capture apparatus placed to capture images of a monitored area; and
- an illumination apparatus placed to illuminate the monitored area with two or more wavelengths, the illumination apparatus adapted to project at least one pattern on the monitored area, wherein the pattern is a dynamic pattern;
- wherein the volume of space monitored includes a volume corresponding to the space defined between the illumination apparatus and the monitored area; and
- wherein the volume of space monitored includes a volume corresponding to the space defined between the monitored area and the image capture apparatus.

19. A system for detecting an object in a monitored area, the system comprising:
- an illumination device adapted to illuminate the monitored area with a pattern;
- an image capture device adapted to capture a live image of the monitored area, including at least a portion of the pattern; and
- detection electronics adapted to divide the monitored area into two or more mask windows and to analyze each mask window separately to detect an object in the monitored area when a change is detected in the pattern in the live image, the change being noted by comparing a reference image showing at least a portion of the pattern to the live image to determine whether any part of the pattern has moved or been removed.

* * * * *